United States Patent
Qian

(10) Patent No.: US 10,425,017 B2
(45) Date of Patent: Sep. 24, 2019

(54) METHOD AND APPARATUS FOR REDUCING CURRENT SENSOR POWER LOSS

(71) Applicant: Infineon Technologies AG, Neubiberg (DE)

(72) Inventor: Weizhe Qian, Beijing (CN)

(73) Assignee: Infineon Technologies AG, Neubiberg (DE)

( * ) Notice: Subject to any disclaimer, the term of this patent is extended or adjusted under 35 U.S.C. 154(b) by 157 days.

(21) Appl. No.: 15/333,678

(22) Filed: Oct. 25, 2016

(65) Prior Publication Data

US 2018/0115254 A1  Apr. 26, 2018

(51) Int. Cl.
| | | |
|---|---|---|
| H02M 7/537 | (2006.01) | |
| H02M 1/08 | (2006.01) | |
| H02M 7/5387 | (2007.01) | |
| H02P 27/08 | (2006.01) | |
| H02M 1/00 | (2006.01) | |

(52) U.S. Cl.
CPC ............ *H02M 7/537* (2013.01); *H02M 1/08* (2013.01); *H02M 7/5387* (2013.01); *H02P 27/08* (2013.01); *H02M 2001/0009* (2013.01); *H02M 2007/53876* (2013.01)

(58) Field of Classification Search
CPC .......... H02M 7/42; H02M 7/44; H02M 7/537; H02M 7/5387; H02M 7/53875; H02M 7/539; H02M 7/5395; H02M 2007/53876; H02M 2001/0009; H02P 27/08

See application file for complete search history.

(56) References Cited

U.S. PATENT DOCUMENTS

| | | | | |
|---|---|---|---|---|
| 6,653,812 B1* | 11/2003 | Huo | ................ | H02M 7/53875 |
| | | | | 318/801 |
| 2013/0264974 A1* | 10/2013 | Suzuki | ................... | H02P 27/08 |
| | | | | 318/139 |
| 2016/0197569 A1* | 7/2016 | Lamprecht | ......... | G01R 19/0092 |
| | | | | 318/493 |

FOREIGN PATENT DOCUMENTS

CN  105099315 A  11/2015

OTHER PUBLICATIONS

"AVR.435: BLDC/BLAC Motor Control Using a Sinus Modulated PWM Algorithm", Atmel Corporation, 8-bit AVR Microcontrollers, Application Note, 2006.

(Continued)

*Primary Examiner* — Gary L Laxton
*Assistant Examiner* — Ivan Laboy
(74) *Attorney, Agent, or Firm* — Murphy, Bilak & Homiller, PLLC

(57) ABSTRACT

A space vector PWM technique includes defining a target voltage vector located in a sector defined by two switching voltage vectors, applying one switching voltage vector to each leg of a power conversion device for a first subperiod of a fixed switching period, applying the other switching voltage vector to each leg for a second subperiod of the switching period and applying some allocation of zero voltage vectors to each leg for a third subperiod of the switching period such that the device outputs approximately the voltage defined by the target voltage vector during the switching period. The zero voltage vectors are allocated, based on a minimum amount of time specified for the current sensors to accurately sense current, such that the zero voltage vector which causes current to flow through the current sensors is applied for a different length of the third subperiod than the other zero voltage vector.

18 Claims, 9 Drawing Sheets

(56) References Cited

OTHER PUBLICATIONS

"Optimized Space Vector Modulation and Over-modulation with the XC866", AP0803620, Infineon Technologies AG, Microcontrollers, Application Note, V 2.0, Sep. 2005.
"Sensing Elements for Current Measurements", Intersil Corporation, 2014.
Kartheek, B.N. et al., "An Optimized Code for Space Vector PWM for a Two Level Voltage Source Inverter", International Journal of Science and Modern Engineering (IJISME), vol. 1, Issue 5, Apr. 2013, pp. 50-52.
Kocalmis Bilhan, Ayse et al., "Modelling and Simulation of Two-Level Space Vector PWM Inverter Using Photovoltaic Cells as DC Source", International Journal of Electronics; Mechanical and Mechatronics Engineering, vol. 2, No. 4, 2013, pp. 311-317.
Mishra, Avinash et al., "Space Vector Pulse Width Modulation", International Journal of Scientific & Engineering Research, vol. 5, Issue 2, Feb. 2014, pp. 1472-1476.
Schulz, Martin, "A Progressive Way to Integrate Current Measurement into Modern Power Electronic Systems", PCIM Europe 2003, Jun. 6, 2008.
Thomas, Auswin George et al., "A Low Cost SVPWM Controller for Five-Phase VSI Using PIC18F4550", International Conference on System Dynamics and Control—ICSDC, Aug. 2010.

\* cited by examiner

METHOD AND APPARATUS FOR REDUCING CURRENT SENSOR POWER LOSS

TECHNICAL FIELD

The instant application relates to current sensors, and more particularly to reducing power loss of current sensors.

BACKGROUND

Shunt resistors and magnetic current sensors are widely used for current measurement in power conversion devices such as converters and inverters. However, shunt resistors and magnetic current sensors are both limited by thermal performance. Power loss through resistive current sensors increases system temperature, and therefore conventional shunt resistors and magnetic current sensors are not well suited for high current measurement, limiting their application area. A smaller resistance device can be used, but is more expensive. The package can be redesigned so as to reduce the thermal resistance of the current sensor. However, this solution also increases cost and the new design may be incompatible with earlier versions.

SUMMARY

A power conversion device has one or more legs using a modulation technique that defines a plurality of switching and zero voltage vectors, each switching voltage vector defining a state in which an output voltage of the power conversion device has non-zero magnitude and phase and the zero voltage vectors defining a state in which the output voltage has zero magnitude and phase, each leg having a current sensor connected in series with that leg. According to an embodiment of a method of controlling the power conversion device, the method comprises: defining a target voltage vector located in a sector defined by first and second ones of the switching voltage vectors; applying the first switching voltage vector to each leg for a first subperiod of a fixed switching period, applying the second switching voltage vector to each leg for a second subperiod of the switching period and applying an allocation of the zero voltage vectors to each leg for a third subperiod of the switching period such that the power conversion device outputs approximately the voltage defined by the target voltage vector during the switching period; and determining, based on a minimum amount of time specified for the current sensors to accurately sense current, the allocation of the zero voltage vectors for the third subperiod such that the zero voltage vector which causes current to flow through the current sensors is applied for a different length of the third subperiod than the zero voltage vector which does not cause current to flow through the current sensors.

According to another embodiment, a power conversion device is provided for converting AC-to-DC or DC-to-AC using a modulation technique that defines a plurality of switching and zero voltage vectors, each switching voltage vector defining a state in which an output voltage of the power conversion device has non-zero magnitude and phase and the zero voltage vectors defining a state in which the output voltage has zero magnitude and phase. The power conversion device comprises one or more legs each connected between a positive voltage rail and a negative voltage rail or ground, a current sensor connected in series with each leg. The controller is operable to: define a target voltage vector located in a sector defined by first and second ones of the switching voltage vectors; apply the first switching voltage vector to each leg for a first subperiod of a fixed switching period, apply the second switching voltage vector to each leg for a second subperiod of the switching period and apply an allocation of the zero voltage vectors to each leg for a third subperiod of the switching period such that the power conversion device outputs approximately the voltage defined by the target voltage vector during the switching period; and determine, based on a minimum amount of time specified for the current sensors to accurately sense current, the allocation of the zero voltage vectors for the third subperiod such that the zero voltage vector which causes current to flow through the current sensors is applied for a different length of the third subperiod than the zero voltage vector which does not cause current to flow through the current sensors.

According to another embodiment of a method of controlling a power conversion device using a space vector PWM (SVPWM) modulation technique in which an output voltage of the power conversion device has non-zero magnitude and phase and the zero voltage vectors defining a state in which the output voltage has zero magnitude and phase, each leg including a current sensor connected in series with that leg, the method comprises: defining a target voltage vector located in a sector defined by first and second ones of the switching voltage vectors; applying a first subperiod of a switching period for the power conversion device to remain in the state defined by the first space vector, a second subperiod of the switching period for the power conversion device to remain in the state defined by the second space vector and a third subperiod of the switching period for the power conversion device to remain in the state defined by the zero voltage vectors such that the power conversion device outputs approximately the voltage defined by the target voltage vector during the switching period; and allocating a lesser share of the third subperiod to a first one of the zero voltage vectors which causes current to flow through the current sensors and a greater share of the third subperiod to a second one of the zero voltage vectors which does not cause current to flow through the current sensors during the switching period.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
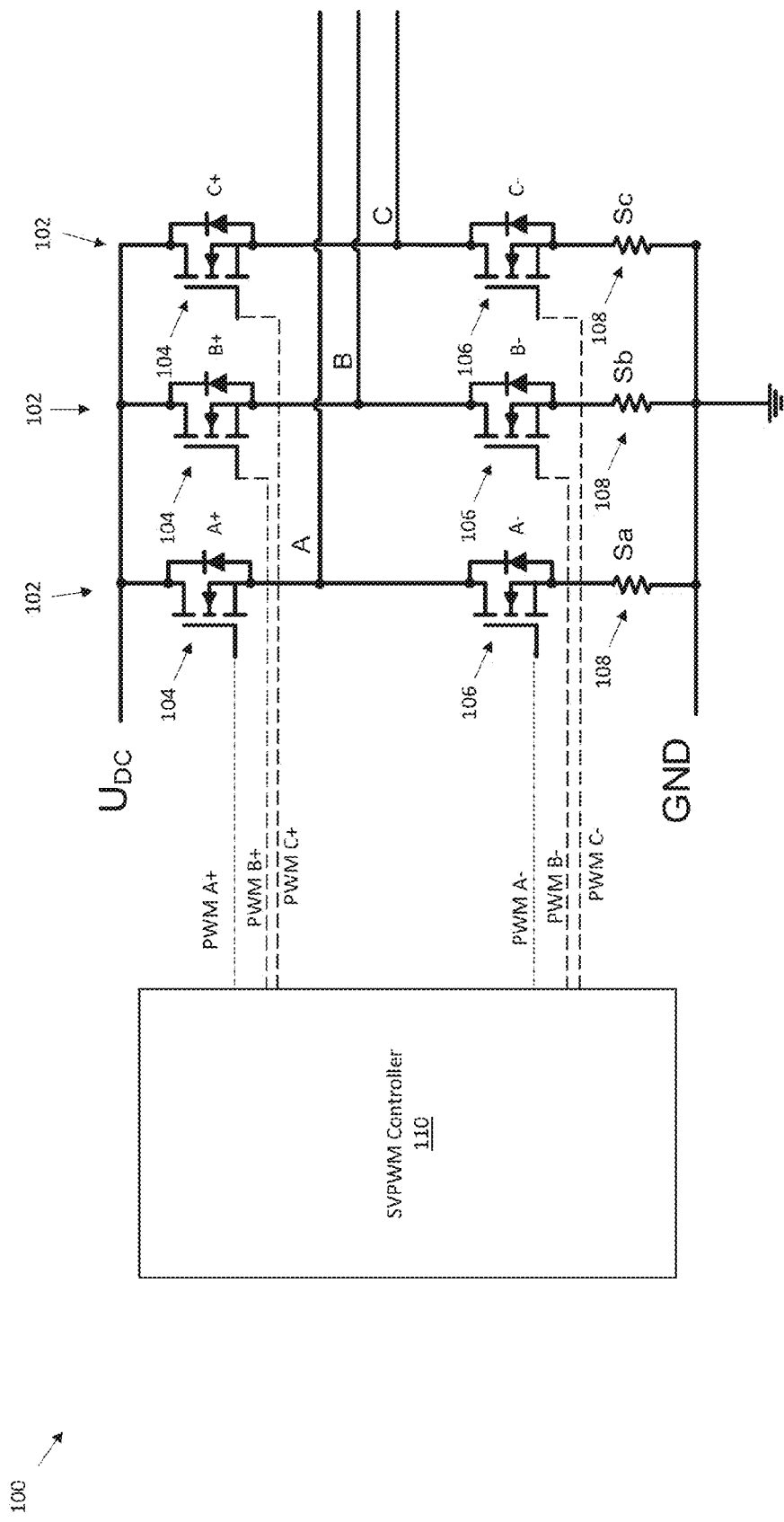
FIG. 1 illustrates a schematic diagram of an embodiment of a 3-phase inverter.

The embodiments described herein provide a space vector pulse width modulation (SVPWM) technique for controlling a power conversion device such as an inverter or converter so as to reduce power loss through current sensors used to sense the current of the device. Space vector modulation (SVM) is an algorithm for the control of pulse width modulation (PWM), and is used to create alternating current (AC) waveforms from a direct current (DC) source in the case of an inverter or to create a DC signal from AC waveforms in the case of a converter. Each leg of the power conversion device is connected between a positive voltage rail and a negative voltage rail or ground, and a current sensor is connected in series with each leg. The switches of each leg are controlled so that at no time both switches are on (conducting) in the same leg. This requirement is satisfied by the complementary operation of the switches within each leg. If a high-side (top) switch is on, the corresponding low-side (bottom) switch is off and vice-versa, so as to prevent damaging shoot-through current. In the case of a 3-phase inverter or converter, this leads to eight possible space vectors $u_0$ through $u_7$ of which six $u_1$ through $u_6$ are active switching voltage vectors and two $u_0$ and $u_7$ are zero voltage vectors. Each switching voltage vector defines a state in which the output voltage of the power conversion device has non-zero magnitude and phase, whereas each zero voltage vector defines a state in which the output voltage has zero magnitude and phase.

The SVPWM technique described herein defines a target voltage vector located in a sector defined by two switching voltage vectors, applies the first switching voltage vector to each leg of the power conversion device for a first subperiod of the fixed switching period, applies the second switching voltage vector to each leg for a second subperiod of the switching period and applies some predefined allocation of the zero voltage vectors to each leg for a third subperiod of the switching period such that the power conversion device outputs approximately the voltage defined by the target voltage vector during the switching period. The SVPWM technique allocates the zero voltage vectors such that the zero voltage vector which causes current to flow through the current sensors of the power conversion device is applied for a different length during the third subperiod than the zero voltage vector which does not cause current to flow through the current sensors. For example, during back-off conditions where the power conversion device is not operating at full power, the zero voltage vectors for the third subperiod can be allocated such that the zero voltage vector which causes current to flow through the current sensors is applied for only the minimum amount of time specified for the current sensors to accurately sense the current flowing through the legs. The zero voltage vector which does not cause current to flow through the current sensors is applied for the remainder of the third subperiod. This way, current flows through the current sensors for only the minimal amount of time needed to accurately sense the current, thereby minimizing power loss through the current sensors. The SVPWM technique is described next in more detail with reference to FIGS. 1-9.

FIG. 1 illustrates an embodiment of a 3-phase inverter 100. The inverter 100 has a leg 102 for each phase, each leg 102 including a high-side (top) switch device 104 connected in series with a low-side (bottom) switch device 106 to form a respective common switching node (A, B, C). A current sensor 108 is connected in series with each leg 102. A controller 110, which implements the SVPWM technique described herein, controls each leg 102 of the 3-phase inverter 100 so to the inverter 100 changes direct current (DC) sourced by $U_{DC}$ to 3-phase (A, B, C) alternating current (AC). The controller 110 can include digital and/or analog circuitry such as one or more controllers, processors, ASICs (application-specific integrated circuits), ADCs (analog-to-digital converters), DACs (digital-to-analog converters), etc. for executing the SVPWM technique described herein. The switch devices 104, 106 of each leg 102 are shown as power MOSFETs (metal-oxide-semiconductor field effect transistors), but can be other types of power transistors such as IGBTs (insulated gate bipolar transistors), HEMTs (high electron mobility transistors), etc. The current sensors 108 connected in series with each leg 102 of the power conversion device 100 are illustrated as resistive elements $S_x$, and in general can be shunt resistors, magnetic current sensors or any other type of current sensor which is limited by thermal performance. In FIG. 1, each current sensor 108 is connected in series between the corresponding low-side switch device 106 and the negative voltage rail or ground (GND). Control of the power conversion device 100 is described next in more detail with reference to FIGS. 2 through 6.

Table 1 below describes the state of the inverter 100, based on the requirement that if a high-side switch device 104 of one leg 102 is on the corresponding low-side switch device 106 of that leg 102 must be off. In Table 1, the 3 phases are indicated by 'A', 'B' and 'C', the line-to-line voltages are indicated by '$V_{AB}$', '$V_{BC}$' and '$V_{CA}$', the high-side switch device 104 for each phase is indicted by '+', and the low-side switch device 106 for each phase is indicted by '−'. As such, 'A+' indicates the high-side switch device 104 for phase A, 'A−' indicates the low-side switch device 106 for phase A, 'B+' indicates the high-side switch device 104 for phase B, etc.

TABLE 1

| Vector | A⁺ | B⁺ | C⁺ | A⁻ | B⁻ | C⁻ | $V_{AB}$ | $V_{BC}$ | $V_{CA}$ | |
|---|---|---|---|---|---|---|---|---|---|---|
| $u_0$ = (000) | OFF | OFF | OFF | ON | ON | ON | 0 | 0 | 0 | zero voltage vector |
| $u_1$ = (100) | ON | OFF | OFF | OFF | ON | ON | $+V_{dc}$ | 0 | $-V_{dc}$ | active vector |
| $u_2$ = (110) | ON | ON | OFF | OFF | OFF | ON | 0 | $+V_{dc}$ | $-V_{dc}$ | active vector |
| $u_3$ = (010) | OFF | ON | OFF | ON | OFF | ON | $-V_{dc}$ | $+V_{dc}$ | 0 | active vector |
| $u_4$ = (011) | OFF | ON | ON | ON | OFF | OFF | $-V_{dc}$ | 0 | $+V_{dc}$ | active vector |
| $u_5$ = (001) | OFF | OFF | ON | ON | ON | OFF | 0 | $-V_{dc}$ | $+V_{dc}$ | active vector |
| $u_6$ = (101) | ON | OFF | ON | OFF | ON | OFF | $+V_{dc}$ | $-V_{dc}$ | 0 | active vector |
| $u_7$ = (111) | ON | ON | ON | OFF | OFF | OFF | 0 | 0 | 0 | zero voltage vector |

Each switching voltage vector $u_1$ through $u_6$ defines a state in which the output voltage of the power conversion device 100 has non-zero magnitude and phase. Zero voltage vectors $u_0$ and $u_7$ define a state in which the output voltage has zero magnitude and phase.

As illustrated in Table 1, the state when switch devices A+, B− and C− are 'ON' and the corresponding switch devices A−, B+, and C+ are 'OFF' is represented by the notation (+, −, −). The state when switch devices A−, B+, and C− are 'ON' and the corresponding switch devices A+, B−, and C+ are 'OFF' is represented by the notation (−, +, −), etc.

Figure 2:
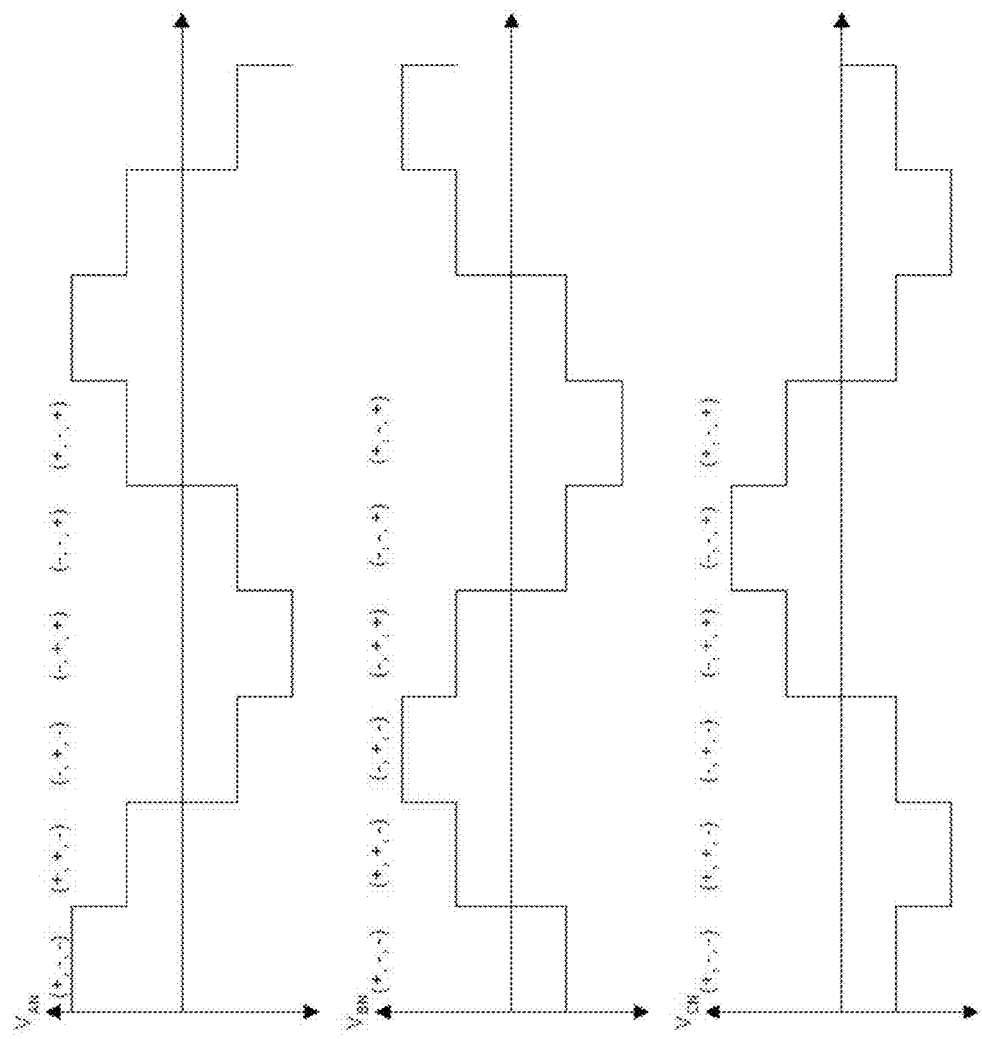
FIGS. 2 through 6 illustrate various diagrams associated with an embodiment of a method of controlling the power conversion device shown in FIG. 1.

Running the inverter 100 through the switching sequence indicated in Table 1 produces the line-to-neutral voltages $V_{AN}$, $V_{BN}$, $V_{CN}$ shown in FIG. 2. The SVPWM technique implemented by the controller 110 is based on the multi-step mode shown in FIG. 2, but smoothes the steps through an averaging technique. For example, if a voltage is required that is between two step voltages, the corresponding inverter states can be activated in such a way that the average of the step voltages produces the desired output. An equivalent geometrical model can be used to develop the equations needed to generate the averaging effect. The inverter voltages of the multi-step mode are first transformed into space vectors space vectors $u_0$ through $u_7$. Since the line-to-neutral voltages $V_{AN}$, $V_{BN}$ and $V_{CN}$ sum to zero, they can be converted into a space vector $\underline{u}_s$ using the following transformation:

$$\underline{u}_s = V_{AN}(t)e^{j0} + V_{BN}(t)e^{j2\pi/3} + V_{CN}(t)e^{-j2\pi/3} \quad (1)$$

Figure 3:
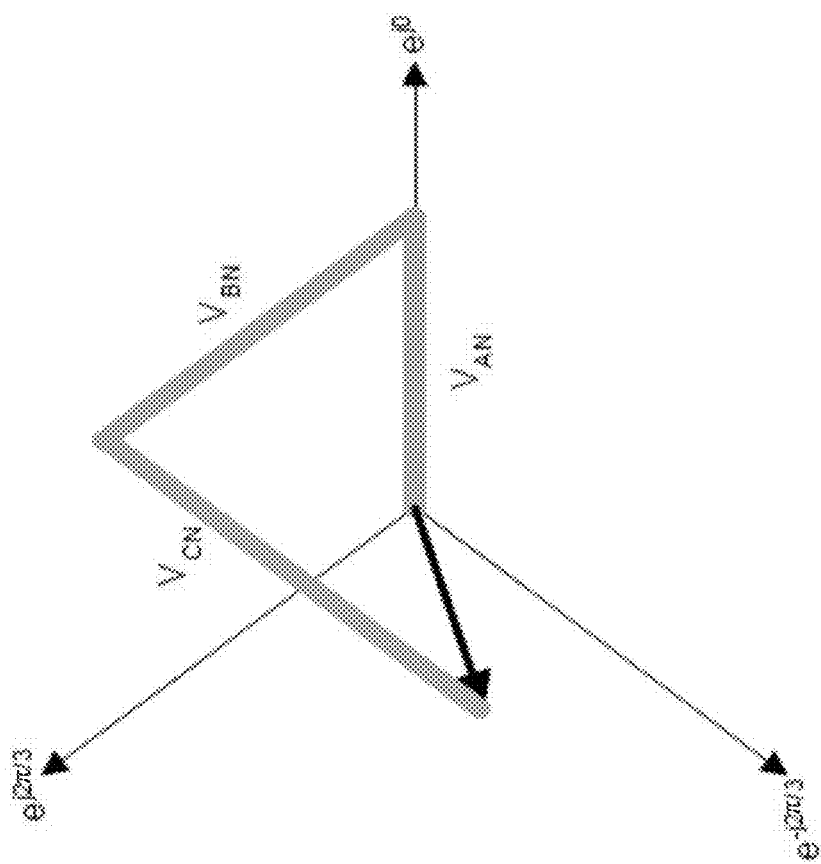

Since the components of the space vectors are projected along constant angles (0, 2π/3, and −2π/3), the space vector $\underline{u}_s$ can be graphically represented as shown in FIG. 3. Typically, the time-varying quantities are sinusoids of the same amplitude and frequency that have 120° phase shifts. When this is the case, the space vector at any given time maintains its magnitude. As time increases, the angle of the space vector increases, causing the vector to rotate with frequency equal to the frequency of the sinusoids. By converting the line-to-neutral voltages shown in FIG. 2 into a space vector plotted on the complex plane, the space vector takes on one of 6 distinct angles as time increases for a 3-phase system.

Figure 4:
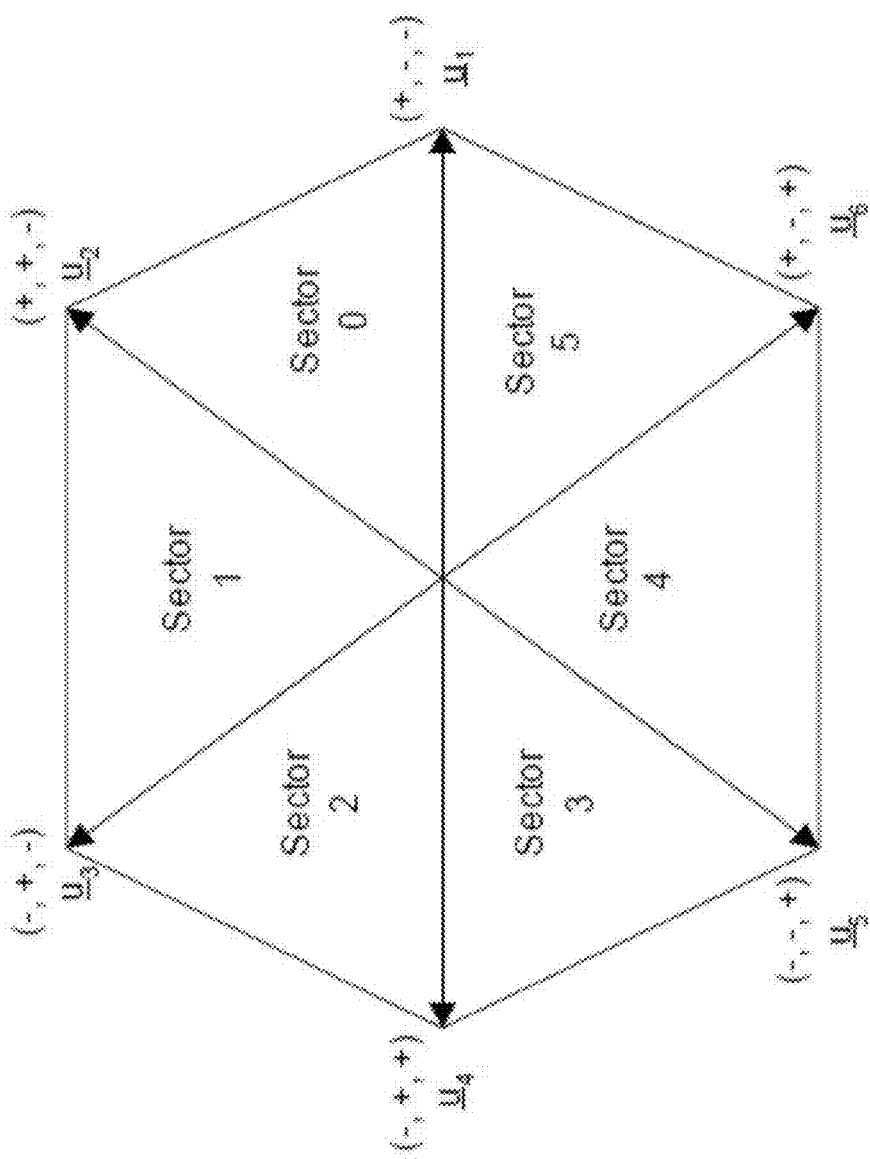

FIG. 4 shows the values that the space vector assumes as time increases, where $\underline{u}_1$ through $\underline{u}_6$ are the switching voltage vectors i.e. the vectors which define a state in which the output voltage of the power conversion device has non-zero magnitude and phase. The controller 110 generates the appropriate PWM signals (PWM X+/−) applied to the gates of the switch devices 104, 106 such that a target voltage vector $\underline{u}_s$ can be approximated. For example, the controller 110 can approximate a target voltage vector $\underline{u}_s$ located in sector 0 defined by switching voltage vectors $\underline{u}_1$ and $\underline{u}_2$ by applying switching voltage vector $\underline{u}_1$ for a percentage of time (ta) and switching voltage vector $\underline{u}_2$ for a percentage of time (tb) such that:

$$ta*\underline{u}_1 + tb*\underline{u}_2 = \underline{u}_s \quad (2)$$

Figure 5:
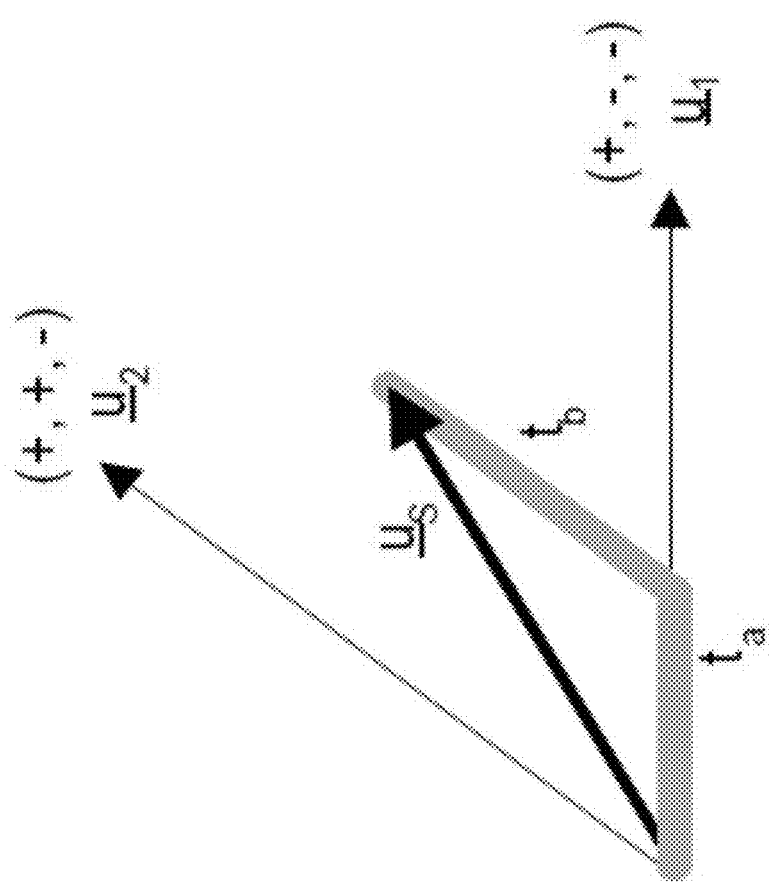

This leads to the following formulas for ta and tb:

$$tb = 2U(3^{-1/2})\sin(\alpha) \quad (3)$$

$$ta = U[\cos(\alpha) - (3^{-1/2})\sin(\alpha)] \quad (4)$$

where $U = |\underline{u}_s|$ (Modulation Index), $\alpha = \angle \underline{u}_s$ Accordingly, a target voltage vector of angle α (in sector 0) and modulation index U can be approximated by applying the two switching voltage vectors which define the sector in which the target voltage vector is located for percentage of times ta and tb, respectively, where 0<U<1. Graphically this is represented in FIG. 5 for target voltage vector $\underline{u}_s$ located in sector 0 defined by switching voltage vectors $\underline{u}_1$ and $\underline{u}_2$.

The SVPWM technique uses PWM pulses of constant frequency i.e. a fixed switching period with variable duty cycle to control the switch devices 104, 106 of the inverter legs 102, wherein the fixed switching period of the carrier frequency is denoted T0. To approximate the target voltage vector $\underline{u}_s$ in FIG. 5, the controller 110 activates the inverter state that corresponds to switching voltage vector $\underline{u}_1$ for ta*T0 seconds, and activates the inverter state that corresponds to switching voltage vector $\underline{u}_2$ for tb*T0 seconds. When the modulation index is sufficiently small (e.g. less than ½(3^{1/2})), the sum of ta and tb is less than one, meaning that ta*T0+tb*T0 is less than the fixed switching period T0. No voltage is output by the power conversion device 100 during the remaining (leftover) time t0 so that the power conversion device 100 outputs approximately the voltage defined by the target voltage vector $\underline{u}_s$ over the fixed switching period T0. The leftover time t0 is given by:

$$t0 = T0(1 - ta - tb) \quad (5)$$

No voltage can be output by the power conversion device 100 in two ways. The first way is to connect all phases to the negative rail of the inverter 100, which is referred to herein as inverter state 0 and has the corresponding switching pattern of (−, −, −). The second way to output no voltage is to connect all phases to the positive rail of the inverter 100, which is referred to herein as inverter state 7 and has the corresponding switching pattern of (+, +, +). To approximate target voltage $\underline{u}_s$ during the fixed switching period T0, the remaining (leftover) time t0 is conventionally split in half and applied equally at the beginning and end of the fixed switching period T0 by applying the zero voltage vectors $u_0$ and $u_7$. However, with such an approach, current flows through the current sensors 108 for approximately half t0, increasing power loss through the current sensors 108.

Figure 6:
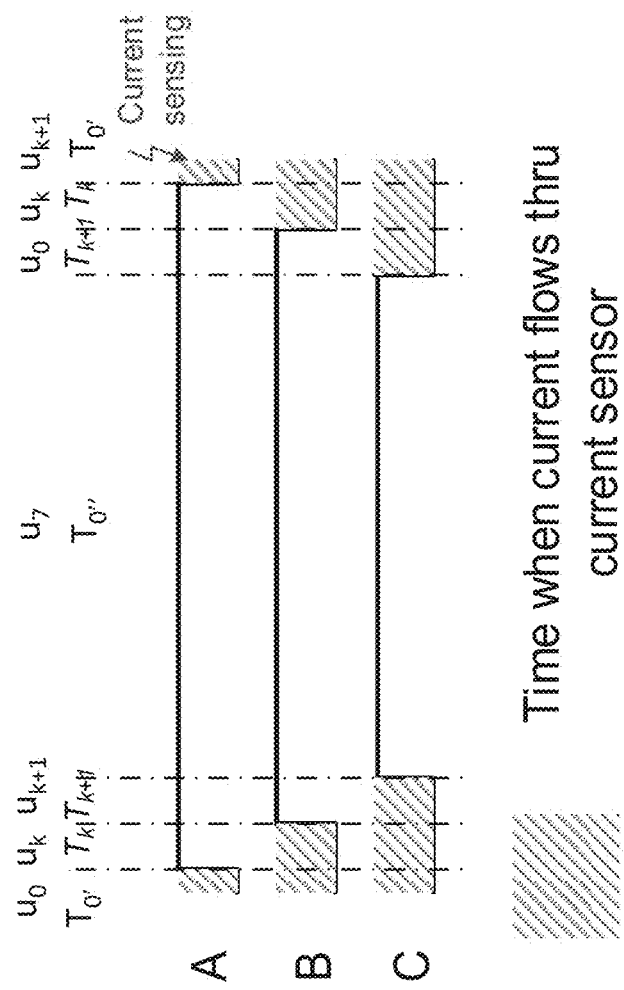

FIG. 6 illustrates the SVPWM technique implemented by the controller 110 so as to reduce the power loss through the current sensors 108 during the leftover time t0 of each fixed switching period T0. The controller 110 applies a first switching voltage vector $\underline{u}_k$ ($\underline{u}_1$ for the target voltage vector example in FIG. 5) to each leg 102 of the power conversion device 100 for a first subperiod $T_k$ of the fixed switching period $T_0$, applies a second switching voltage vector $\underline{u}_{k+1}$ ($\underline{u}_2$ for the target voltage vector example in FIG. 5) to each leg 102 for a second subperiod $T_{k+1}$ of the switching period and applies an allocation of the zero voltage vectors $\underline{u}_0$ and $\underline{u}_7$ to each leg 102 for a third subperiod $T_{0'} + T_{0''}$ of the switching period $T_0$ so that the power conversion device 100 outputs approximately the voltage defined by the target voltage vector $\underline{u}_s$ during the fixed switching period t). The first and second subperiods $T_k$ and $T_{k+1}$ correspond to ta and tb, respectively, in equation (5).

The controller 110 also determines, based on the minimum amount of time specified for the current sensors to accurately sense current, the allocation of the zero voltage vectors $\underline{u}_0$ and $\underline{u}_7$ for the third subperiod $T_{0'} + T_{0''}$ such that the zero voltage vector which causes current to flow through the current sensors is applied for a different length ($T_{0'}$) of the third subperiod than the zero voltage vector which does not cause current to flow through the current sensors. The subperiods $T_k$ and $T_{k+1}$ of the switching voltage vectors $\underline{u}_k$ and $\underline{u}_{k+1}$ ($\underline{u}_1$ and $\underline{u}_2$ for the target voltage vector example in FIG. 5) are unchanged by the allocation of the zero voltage vectors $\underline{u}_0$ and $\underline{u}_7$ for the third subperiod $T_{0'} + T_{0''}$. As a result, the final voltage modulation output is not affected.

For the power conversion device embodiment illustrated in FIG. 1, each current sensor 108 is connected in series between the respective low-side (bottom) switch device 106 and the negative voltage rail or ground. Zero voltage vector $\underline{u}_0$ causes each low-side switch device 106 to switch on and each high-side (top) switch device 104 to switch off, and zero voltage vector $\underline{u}_7$ causes each high-side switch device 104 to switch on and each low-side switch device 106 to switch off. Based on the current sensor position shown in FIG. 1, the controller 110 determines the allocation of the zero voltage vectors $\underline{u}_0$ and $\underline{u}_7$ such that the low-side switch devices 106 conduct for less time ($T_{0'}$) than the high-side switch devices 104 during the third subperiod $T_{0'}+T_{0''}$ of the switching period $T_0$ i.e. during leftover time t0 in equation (5).

As shown in FIG. 6, the SVPWM technique implemented by the controller 110 shortens the on-time of the current sensors 108 from approximately half of the leftover time t0 to $T_{0'}$, where $T_{0'}$ is the time duration during which zero voltage vector $\underline{u}_0$ is applied. To maintain the same fixed PWM frequency or period, the time duration of the other zero voltage vector $\underline{u}_7$ is extended to $T_{0''}$. The controller 110 ensures subperiods $T_{0'}$ and $T_{0''}$ comply with the following equations:

$$T_{0'} = T_z - T_x \quad (6)$$

$$T_{0''} = T_z + T_x \quad (7)$$

where $2T_z = T_{0'} + T_{0''}$ is the third subperiod, and $T_x$ is the amount of adjustment.

The shortened time $T_{0'}$ can be tuned to a minimum, as long as accurate phase current can be captured. The minimum time for $T_{0'}$ can be determined based on the following parameters related to current sensing: switch delay, sampling time, noise filtering, data acquisition delay and etc. Normally, a few micro-seconds is sufficient. The time duration of valid voltage vectors $T_k$ and $T_{k+1}$ are unchanged with the approach described above. As a result, the approach will not change the final voltage modulation output.

During back-off conditions where the power conversion device 100 is not operating at full power e.g. at less than 90% of modulation index, the controller 110 can determine the allocation of the zero voltage vectors $\underline{u}_0$ and $\underline{u}_7$ for the third subperiod $T_{0'}+T+T_{0''}$ of the switching period $T_0$ such that the zero voltage vector which causes current to flow through the current sensors 108 ($\underline{u}_0$ for the current sensor arrangement shown in FIG. 1) is applied for a shorter length ($T_{0'}$) of the third subperiod $T_{0'}+T_{0''}$ than the zero voltage vector which does not cause current to flow through the current sensors ($\underline{u}_7$ for the current sensor arrangement shown in FIG. 1).

In some cases, the controller 110 determines the allocation of the zero voltage vectors $\underline{u}_0$ and $\underline{u}_7$ for the third subperiod $T_{0'}+T_{0''}$ of the fixed switching period $T_0$ such that the zero voltage vector which causes current to flow through the current sensors ($\underline{u}_0$ for the current sensor arrangement shown in FIG. 1) is applied for only the minimum amount of time ($T_{0'}$=min) specified for the current sensors 108 to accurately sense the current flowing through the legs 102 and the zero voltage vector which does not cause current to flow through the current sensors ($\underline{u}_7$ for the current sensor arrangement shown in FIG. 1) is applied for the remainder $T_{0''}$ of the third subperiod $T_{0'}+T_{0''}$. In one embodiment, the minimum amount of time specified for the current sensors 108 to accurately sense the current flowing through the legs 102 is a switch delay of the current sensors 108. In another embodiment, the minimum amount of time specified for the current sensors 108 to accurately sense the current flowing through the legs 102 is a sampling time of the current sensors 108. In yet another embodiment, the minimum amount of time specified for the current sensors 108 to accurately sense the current flowing through the legs 102 is a noise filtering requirement of the current sensors 108. In still another embodiment, the minimum amount of time specified for the current sensors 108 to accurately sense the current flowing through the legs 102 is a data acquisition delay of the current sensors 108. In other cases, the controller 110 adds margin to the minimum specified time when determining $T_{0'}$, e.g. to account for variability.

The SVPWM technique has been described so far with respect to a current sensor placement in the lower part of each leg of a power conversion device. Described next is an embodiment in which the current sensors are placed in the upper part of each leg.

Figure 7:
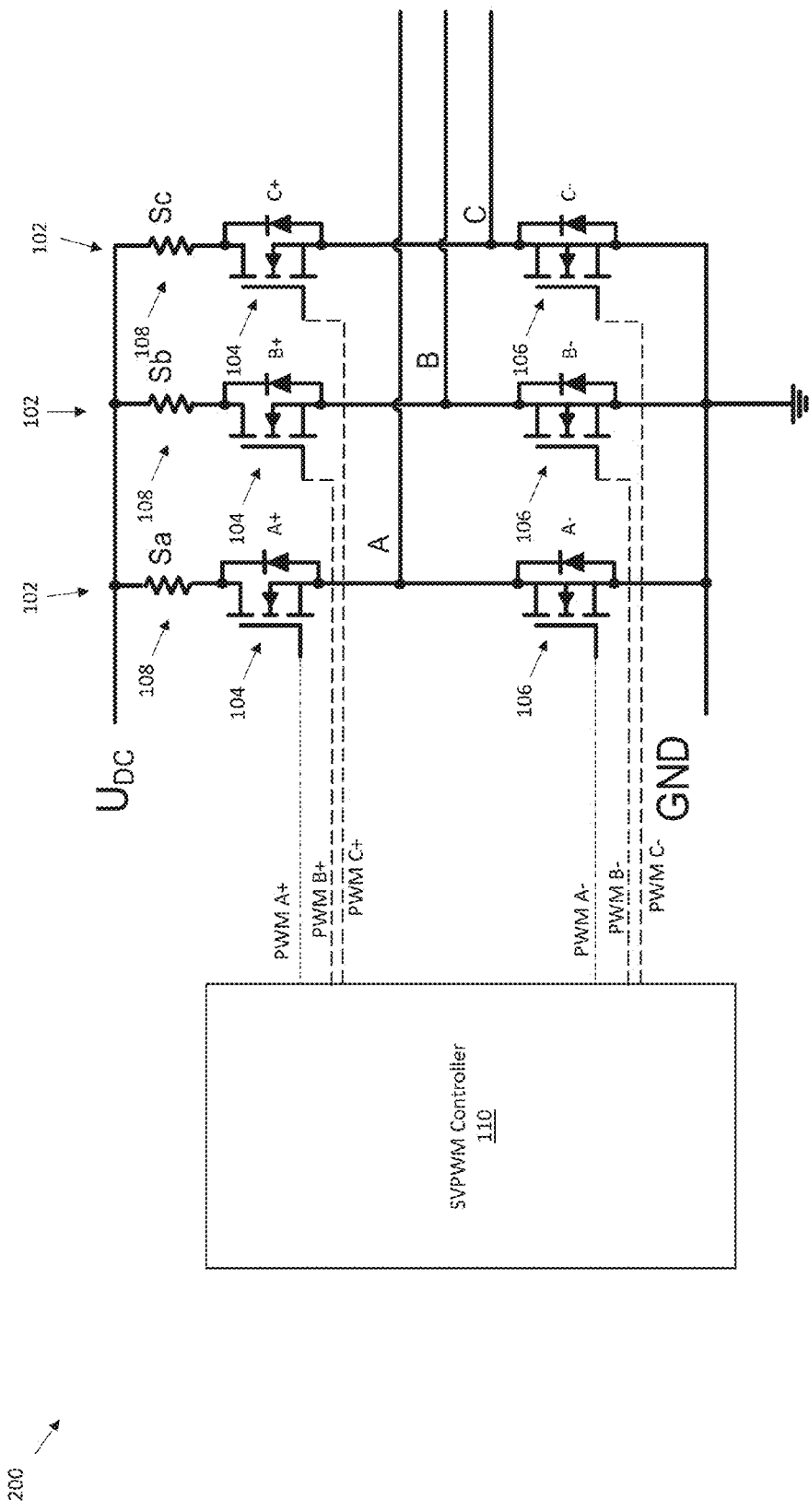
FIG. 7 illustrates a schematic diagram of another embodiment of a 3-phase inverter.

FIG. 7 illustrates another embodiment of a 3-phase inverter 200. The inverter embodiment shown in FIG. 7 is similar to the one shown in FIG. 1. Different, however, each current sensor 108 is connected in series between the corresponding high-side switch 104 and the positive voltage rail $U_{DC}$. As such, zero voltage vector $\underline{u}_7$ causes each high-side switch device 104 to switch on and each low-side switch device 106. Conversely, zero voltage vector $\underline{u}_0$ causes each low-side switch device 106 to switch on and each high-side switch device 104 to switch off. The controller 110 determines the allocation of the zero voltage vectors $\underline{u}_0$ and $\underline{u}_7$ such that the high-side switch devices 104 conduct for less time than the low-side switch devices 106 during the third subperiod $T_{0'}+T_{0''}$ of the switching period $T_0$.

Figure 8:
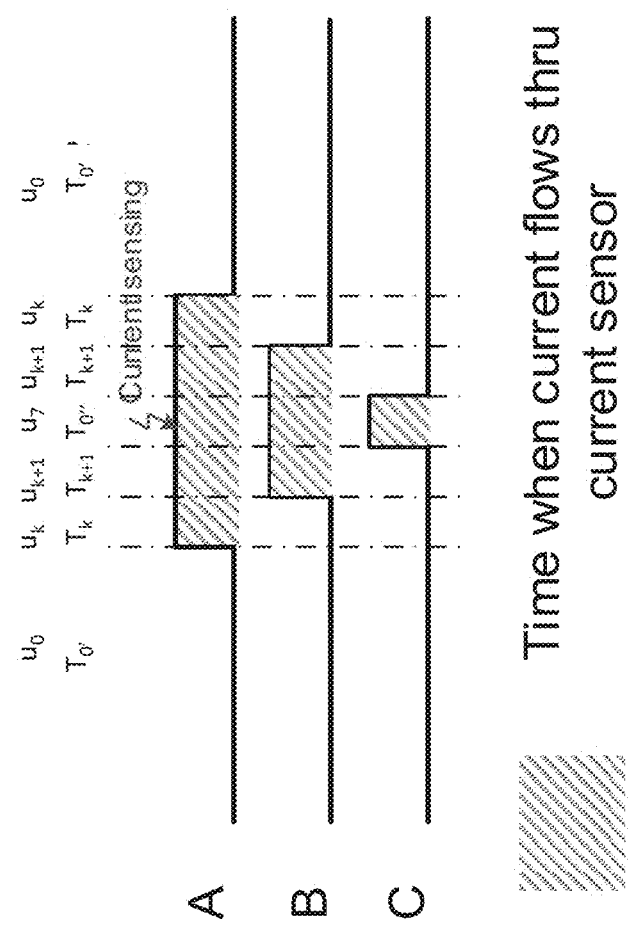
FIG. 8 illustrates a diagram associated with an embodiment of a method of controlling the power conversion device shown in FIG. 7.
Figure 9:
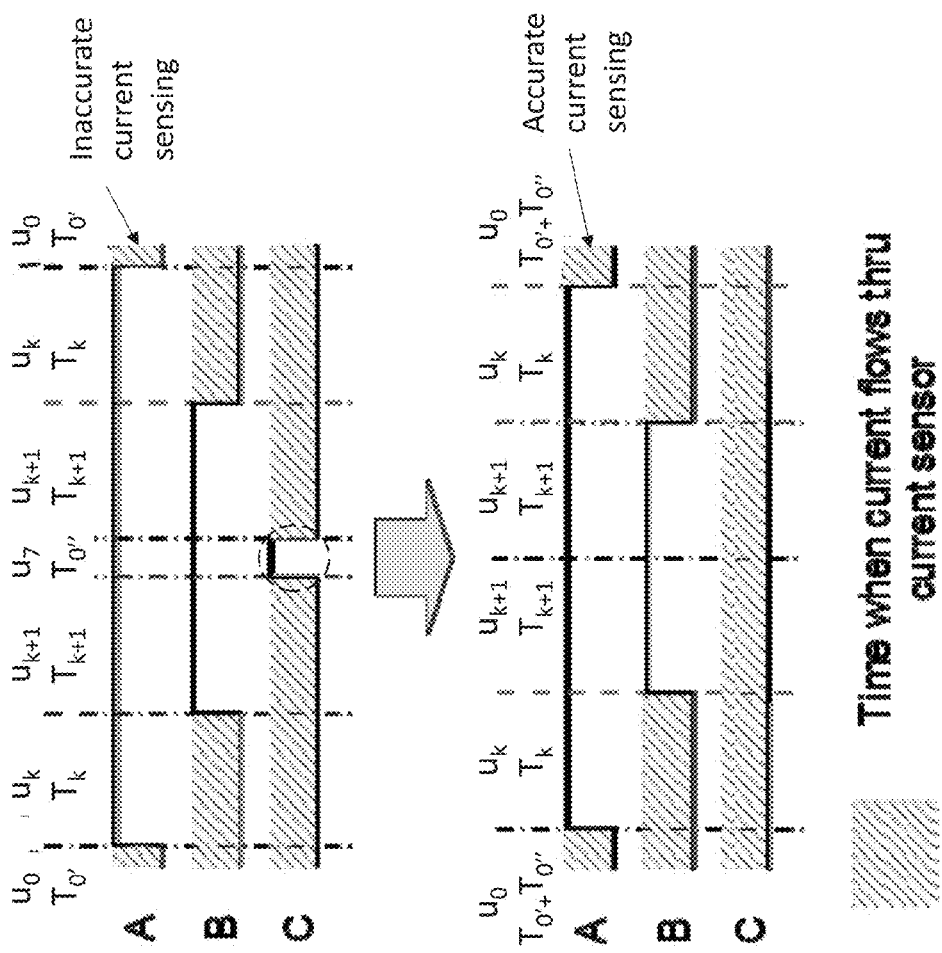
FIG. 9 illustrates a diagram associated with an embodiment of a method of controlling a power conversion device during heavy load conditions.

FIG. 8 shows the SVPWM technique implemented by the controller 110 for the 3-phase inverter 200 of FIG. 7. The controller 110 shortens the on-time of the current sensors 108 from approximately half of the leftover time t0 to $T_{0''}$ where $T_{0''}$ is the time duration during which zero voltage vector $\underline{u}_7$ is applied and satisfies equations (6) and (7) above. The shortened time $T_{0''}$ can be tuned to a minimum, as long as accurate phase current can be captured. As previously described herein, the minimum time for $T_{0''}$ can be determined based on the following parameters related to current sensing: switch delay, sampling time, noise filtering, data acquisition delay and etc. As with the previous embodiment, the time duration of valid voltage vectors $T_k$ and $T_{k+1}$ are unchanged with the approach described above. As a result, the approach will not change the final voltage modulation output.

During back-off conditions where the power conversion device 100 is not operating at full power e.g. at less than 90% of modulation index, the controller 110 can determine the allocation of the zero voltage vectors $\underline{u}_0$ and $\underline{u}_7$ for the third subperiod $T_{0'}+T_{0''}$ of the fixed switching period $T_0$ such that zero voltage vector $\underline{u}_7$ is applied for a shorter length ($T_{0''}$) of the third subperiod $T_{0'}+T_{0''}$ than zero voltage vector $\underline{u}_0$ so that current flows the current sensors 108 for as little time as needed to accurately sense the current.

During heavy load conditions e.g. when the modulation index is more than 90% e.g. almost close to 100%, the controller 110 determines the allocation of the zero voltage vectors $\underline{u}_0$ and $\underline{u}_7$ for the third subperiod $T_{0'}+T_{0''}$ of the fixed switching period $T_0$ such that the zero voltage vector which causes current to flow through the current sensors 108 is applied for the entire third subperiod and the zero voltage vector which does not cause current to flow through the current sensors is not applied during the third subperiod. Returning to the exemplary low-side current sensor implementation shown in FIG. 1, the ON-time of the phase-A low-side switch device 106 (labeled 'A-' in FIG. 1) may be too short during heavy load conditions to capture an accurate current measurement. In this case, the time duration of zero voltage vector $\underline{u}_7$ in the middle of the fixed PWM switching period when all 3 high-side switch devices 104 are turned ON can be eliminated. This part of the third subperiod, which is indicated by a dashed circle in the top half of FIG. 9, can be added to the part of the third subperiod when all 3 phase low-side switch devices 106 are turned ON. Doing so doubles the original sampling time of phase-A current, which is shown in the bottom half of FIG. 9. That is, the part of the third subperiod initially allocated to zero voltage vector $\underline{u}_0$ ($T_{0'}$) is increased to $T_{0'}+T_{0'''}$. The time duration of the switching voltage vectors $T_k$ and $T_{k+1}$ remain unaffected by this change as previously described herein.

In effect, this approach during heavy load conditions changes original 7-sector SVPWM to 5-sector SVPWM. The captured phase-A current can be used for normal control or for functional safety purpose. For example, the sum of all 3 phase currents should equal zero for a motor load having star-connected windings. The same implementation during heavy load conditions can be applied to the inverter topology shown in FIG. 8, in which the current sensors 108 are connected in series between the corresponding high-side switch devices 104 and the positive voltage rail $U_{DC}$.

Spatially relative terms such as "under", "below", "lower", "over", "upper" and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open-ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method of controlling a power conversion device having one or more legs using a modulation technique that defines a plurality of switching voltage vectors and zero voltage vectors, each switching voltage vector defining a state in which an output voltage of the power conversion device has non-zero magnitude and phase and the zero voltage vectors defining a state in which the output voltage has zero magnitude and phase, each leg having a current sensor connected in series with that leg, the method comprising:

defining a target voltage vector located in a sector defined by a first switching voltage vector and a second switching voltage vector;

applying the first switching voltage vector to each leg for a first subperiod of a fixed switching period, applying the second switching voltage vector to each leg for a second subperiod of the switching period and applying an allocation of the zero voltage vectors to each leg for a third subperiod of the switching period such that the power conversion device outputs approximately the voltage defined by the target voltage vector during the switching period;

determining, based on a minimum amount of time specified for the current sensors to accurately sense current, the allocation of the zero voltage vectors for the third subperiod such that the zero voltage vector which causes current to flow through the current sensors is applied for a different length of the third subperiod than the zero voltage vector which does not cause current to flow through the current sensors, and during heavy load conditions, determining the allocation of the zero voltage vectors for the third subperiod such that the zero voltage vector which causes current to flow through the current sensors is applied for the entire third subperiod and the zero voltage vector which does not cause current to flow through the current sensors is not applied during the third subperiod.

2. The method of claim 1, wherein each leg of the power conversion device comprises a first transistor coupled between a positive voltage rail and a common switching node and a second transistor coupled between the common switching node and a negative voltage rail or ground, wherein each current sensor is connected in series between the respective second transistor and the negative voltage rail or ground, wherein a first zero voltage vector of the zero voltage vectors causes each second transistor to switch on and each first transistor to switch off, wherein a second zero voltage vector of the zero voltage vectors causes each first transistor to switch on and each second transistor to switch off, and wherein the allocation of the zero voltage vectors is determined such that the second transistors conduct for less time than the first transistors during the third subperiod of the switching period.

3. The method of claim 1, wherein each leg of the power conversion device comprises a first transistor coupled between a positive voltage rail and a common switching node and a second transistor coupled between the common switching node and a negative voltage rail or ground, wherein each current sensor is connected in series between the respective first transistor and the positive voltage rail, wherein a first zero voltage vector of the zero voltage vectors causes each first transistor to switch on and each second transistor to switch off, wherein a second zero voltage vector of the zero voltage vectors causes each second transistor to switch on and each first transistor to switch off, and wherein the allocation of the zero voltage vectors is determined such that the first transistors conduct for less time than the second transistors during the third subperiod of the switching period.

4. The method of claim 1, wherein the allocation of the zero voltage vectors for the third subperiod is determined such that the zero voltage vector which causes current to flow through the current sensors is applied for a shorter length of the third subperiod than the zero voltage vector which does not cause current to flow through the current sensors.

5. The method of claim 1, wherein the allocation of the zero voltage vectors for the third subperiod is determined such that the zero voltage vector which causes current to flow through the current sensors is applied for only the minimum amount of time specified for the current sensors to accurately sense the current flowing through the legs and the zero voltage vector which does not cause current to flow through the current sensors is applied for the remainder of the third subperiod.

6. The method of claim 5, wherein the minimum amount of time specified for the current sensors to accurately sense the current flowing through the legs is a switch delay of the current sensors.

7. The method of claim 5, wherein the minimum amount of time specified for the current sensors to accurately sense the current flowing through the legs is a sampling time of the current sensors.

8. The method of claim 5, wherein the minimum amount of time specified for the current sensors to accurately sense the current flowing through the legs is a noise filtering requirement of the current sensors.

9. The method of claim 5, wherein the minimum amount of time specified for the current sensors to accurately sense the current flowing through the legs is a data acquisition delay of the current sensors.

10. A power conversion device for converting AC-to-DC or DC-to-AC using a modulation technique that defines a plurality of switching voltage vectors and zero voltage vectors, each switching voltage vector defining a state in which an output voltage of the power conversion device has non-zero magnitude and phase and the zero voltage vectors defining a state in which the output voltage has zero magnitude and phase, the power conversion device comprising:
one or more legs each connected between a positive voltage rail and a negative voltage rail or ground;
a current sensor connected in series with each leg of the one or more legs; and
a controller operable to:
define a target voltage vector located in a sector defined by a first switching voltage vector and a second switching voltage vector;
apply the first switching voltage vector to each leg for a first subperiod of a fixed switching period, apply the second switching voltage vector to each leg for a second subperiod of the switching period and apply an allocation of the zero voltage vectors to each leg for a third subperiod of the switching period such that the power conversion device outputs approximately the voltage defined by the target voltage vector during the switching period; and
determine, based on a minimum amount of time specified for the current sensors to accurately sense current, the allocation of the zero voltage vectors for the third subperiod such that the zero voltage vector which causes current to flow through the current sensors is applied for a different length of the third subperiod than the zero voltage vector which does not cause current to flow through the current sensors, wherein, during heavy load conditions, the controller is operable to allocate the zero voltage vectors for the third subperiod such that the zero voltage vector which causes current to flow through the current sensors is applied for the entire third subperiod and the zero voltage vector which does not cause current to flow through the current sensors is not applied during the third subperiod.

11. The power conversion device of claim 10, wherein each leg of the power conversion device comprises a first transistor coupled between a positive voltage rail and a common switching node and a second transistor coupled between the common switching node and a negative voltage rail or ground, wherein each current sensor is connected in series between the respective second transistor and the negative voltage rail or ground, wherein a first zero voltage vector of the zero voltage vectors causes each second transistor to switch on and each first transistor to switch off, wherein a second zero voltage vector of the zero voltage vectors causes each first transistor to switch on and each second transistor to switch off, and wherein the controller is operable to allocate the zero voltage vectors such that the second transistors conduct for less time than the first transistors during the third subperiod of the switching period.

12. The power conversion device of claim 10, wherein each leg of the power conversion device comprises a first transistor coupled between a positive voltage rail and a common switching node and a second transistor coupled between the common switching node and a negative voltage rail or ground, wherein each current sensor is connected in series between the respective first transistor and the positive voltage rail, wherein a first zero voltage vector of the zero voltage vectors causes each first transistor to switch on and each second transistor to switch off, wherein a second zero voltage vector of the zero voltage vectors causes each second transistor to switch on and each first transistor to switch off, and wherein the controller is operable to allocate the zero voltage vectors such that the first transistors conduct for less time than the second transistors during the third subperiod of the switching period.

13. The power conversion device of claim 10, wherein the controller is operable to allocate the zero voltage vectors for the third subperiod such that the zero voltage vector which causes current to flow through the current sensors is applied for a shorter length of the third subperiod than the zero voltage vector which does not cause current to flow through the current sensors.

14. The power conversion device of claim 10, wherein the controller is operable to allocate the zero voltage vectors for the third subperiod such that the zero voltage vector which causes current to flow through the current sensors is applied for only the minimum amount of time specified for the current sensors to accurately sense the current flowing through the legs and the zero voltage vector which does not cause current to flow through the current sensors is applied for the remainder of the third subperiod.

15. The power conversion device of claim 14, wherein the minimum amount of time specified for the current sensors to accurately sense the current flowing through the legs is a switch delay of the current sensors.

16. The power conversion device of claim 14, wherein the minimum amount of time specified for the current sensors to accurately sense the current flowing through the legs is a sampling time of the current sensors.

17. The power conversion device of claim 14, wherein the minimum amount of time specified for the current sensors to accurately sense the current flowing through the legs is a noise filtering requirement of the current sensors.

18. The power conversion device of claim 14, wherein the minimum amount of time specified for the current sensors to accurately sense the current flowing through the legs is a data acquisition delay of the current sensors.

* * * * *